(12) United States Patent
Saiki et al.

(10) Patent No.: US 11,027,533 B2
(45) Date of Patent: Jun. 8, 2021

(54) METHOD FOR PRODUCING LAMINATED BODY, LAMINATED BODY AND PAPER PACKAGING MATERIAL

(71) Applicant: TOPPAN PRINTING CO., LTD., Tokyo (JP)

(72) Inventors: Akiko Saiki, Tokyo (JP); Kosuke Shimizu, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 148 days.

(21) Appl. No.: 16/157,785

(22) Filed: Oct. 11, 2018

(65) Prior Publication Data
US 2019/0078261 A1 Mar. 14, 2019

Related U.S. Application Data

(63) Continuation of application No. PCT/JP2017/015351, filed on Apr. 14, 2017.

(30) Foreign Application Priority Data

Apr. 14, 2016 (JP) .............................. JP2016-080992

(51) Int. Cl.
*B32B 29/00* (2006.01)
*B32B 29/02* (2006.01)

(52) U.S. Cl.
CPC .............. *B32B 29/00* (2013.01); *B32B 29/02* (2013.01); *Y10T 428/24802* (2015.01); *Y10T 428/24851* (2015.01); *Y10T 428/249925* (2015.04); *Y10T 428/249926* (2015.04)

(58) Field of Classification Search
CPC ............ B32B 29/00; Y10T 428/24802; Y10T 428/24851; Y10T 428/249925; Y10T 428/249926
USPC ....................................................... 428/32.18
See application file for complete search history.

(56) References Cited

U.S. PATENT DOCUMENTS

| 2001/0051239 A1* | 12/2001 | Yamada | B65D 5/746 428/35.7 |
| 2006/0231223 A1 | 10/2006 | Ward et al. | |
| 2014/0206798 A1* | 7/2014 | Oomori | C09D 7/70 524/35 |
| 2019/0078261 A1* | 3/2019 | Saiki | D21H 19/22 |

FOREIGN PATENT DOCUMENTS

| CN | 102686399 A | 9/2012 |
| EP | 2 267 222 A1 | 12/2010 |
| JP | 6-7568 | 2/1994 |
| JP | 6-27526 | 4/1994 |
| JP | 3641690 | 2/2005 |
| JP | 2012-11651 | 1/2012 |
| JP | 2013-213111 | 10/2013 |
| JP | 2015-24539 | 2/2015 |
| JP | 2015-227517 | 12/2015 |
| WO | WO 2014/181560 A1 | 11/2014 |
| WO | WO 2015/136493 A1 | 9/2015 |

OTHER PUBLICATIONS

European Office Action dated Oct. 4, 2019 in corresponding European Patent Application No. 17782530.4.
Monthly Report, No. 256, Tokan Kogyo Honsha Monthly Report Henshu Iinkai, Jan. 15, 2015, pp. 8.**.
International Search Report dated Jun. 27, 2017 in corresponding International Patent Application No. PCT/JP2017/015351.
Written Opinion of the International Searching Authority dated Jun. 27, 2017 in corresponding International Patent Application No. PCT/JP2017/015351.
Chinese Office Action dated Jul. 31, 2020 in corresponding Chinese Patent Application No. 201780022973.7.
"Plant Fiber Chemistry" (the fourth version), Pei Jicheng, pp. 230-232, China Light Industry Press, Jan. 2014.
Chinese Office Action dated Mar. 11, 2021, in corresponding Chinese Patent Application No. 201780022973.7.

* cited by examiner

*Primary Examiner* — Betelhem Shewareged

(57) ABSTRACT

A method for producing a laminated body including a base material and a coating layer laminated on the base material, includes: applying a coating liquid containing cellulose nanofibers onto the base material composed of at least acid-resistant paper, thereby forming the coating layer. In addition, an average fiber diameter of the cellulose nanofibers is 2 nm or more and 2000 nm or less, a content of the cellulose nanofibers in the coating liquid is 10 mass % or more of solid contents of the coating liquid, and a coating amount of the coating layer is 0.2 g/m² or more in dry mass.

11 Claims, No Drawings

METHOD FOR PRODUCING LAMINATED BODY, LAMINATED BODY AND PAPER PACKAGING MATERIAL

CROSS REFERENCE TO RELATED APPLICATIONS

This application is a Continuation Application based on International Patent Application No. PCT/JP2017/015351, filed Apr. 14, 2017, which claims priority on Japanese Patent Application No. 2016-080992, filed Apr. 14, 2016, the contents of which are incorporated herein by reference.

TECHNICAL FIELD

The present invention relates to a method for producing a laminated body, a laminated body and a paper packaging material.

BACKGROUND ART

Paper cup containers are widely used as containers for foods such as drinks, soups, noodles and yogurt. Due to the growing interest in environmental problems in recent years, paper containers have been used even in the field where plastic containers have been used.

As a type of paper used for paper containers, "cup base paper" having characteristics such as sanitary property, odorlessness and formability is used as paper for primary food containers. Particularly, in a case where paper containers are applied to containers for lactic acid bacteria foods such as lactic acid bacteria beverages and yogurt, neutralized paper called "acid-resistant paper" is used. In Japan, usually, "acidic paper" that uses aluminum sulfate as a fixing agent is widely used in order to make it easy to fix a rosin-type sizing agent on paper. However, when an acidic food such as lactic acid bacteria food is filled in a container formed using acidic paper, moisture of the food may ooze out from the edge of the acidic paper. Therefore, "acid-resistant paper" that does not use the rosin-type sizing agent or the fixing agent as described above is used for paper containers for acidic foods.

For acid-resistant paper, neutral sizing agents such as alkyl ketene dimer and alkenyl succinic anhydride are used as sizing agents. It is considered that these sizing agents react with hydroxyl groups in cellulose, thereby rendering the fiber surface of cellulose hydrophobic and exerting size effect. Since acid-resistant paper uses a sizing agent having strong hydrophobicity, it is difficult for water to penetrate thereinto, and paper having high hydrophobicity is obtained.

When acid-resistant paper is used, if various kinds of coatings are applied onto the base paper for printing or providing a functional layer, various problems may occur due to the strength of its hydrophobicity. For example, when performing printing on acid-resistant paper using solvent-type gravure rotary ink, the printed ink may penetrate into the base paper due to the strong lipophilicity of the sizing agent, thereby causing chalking and causing lamination strength failure during lamination processing. Therefore, ink composition for paper gravure rotary printing that makes an excellent laminating strength by preventing the penetration of ink has been proposed (refer to, for example, Patent Document 1).

Conversely, if a highly hydrophilic water-based coating liquid is applied onto acid-resistant paper, due to the strength of its hydrophobicity, a portion repelling the coating liquid and film thickness unevenness may easily occur, and it may be difficult to obtain a uniform coated film. In order to improve the coatability of the coating liquid, it is necessary to modify the coating liquid by adding various additives such as a solvent, a thickener, a leveling agent and a surfactant thereto. Therefore, the preparation process of the coating liquid may become complicated, or the use of a chemical substance unrelated to the function of the coating film may be needed.

On the other hand, in recent years, cellulose that is a naturally derived environmentally-friendly biomass material has attracted attention as a functional material. Cellulose is a main component of paper, is contained in cell walls of plants, extracorporeal secretions of microorganisms, mantle membranes of sea squirt or the like, and is the polysaccharide that most abundantly exists on the earth. In addition, cellulose has biodegradability and high crystallinity, and is excellent in stability and safety. Therefore, cellulose is expected to be applied and expanded into various fields. Among cellulose, cellulose nanofibers obtained by pulverizing cellulose materials such as wood pulp into fibrils or microfibrils through mechanically defibration treatment are attracting particular attention. Cellulose nanofibers have characteristics such as a high elastic modulus, a high strength and a low linear expansion coefficient. Therefore, studies are extensively performed on increasing the strength of materials by combining cellulose nanofibers and resins (refer to, for example, Patent Document 2).

DOCUMENT OF RELATED ART

Patent Document

[Patent Document 1] Japanese Patent Application, First Publication No. 2013-213111
[Patent Document 2] Japanese Patent Granted Publication No. 3641690

SUMMARY OF INVENTION

Technical Problem

The present invention is made in view of the above problems, and an object thereof is to provide a method for producing a laminated body, which can forms a uniform coating layer on a base material composed of acid-resistant paper by using a water-based coating liquid containing cellulose nanofibers and easily coatable on acid-resistant paper, a laminated body, and a paper packaging material composed of the laminated body.

Solution to Problem

In order to solve the above problems, a first aspect of the present invention is a method for producing a laminated body including a base material and a coating layer laminated on the base material, the method including: a step of applying a coating liquid containing cellulose nanofibers onto the base material composed of at least acid-resistant paper, thereby forming the coating layer. In addition, an average fiber diameter of the cellulose nanofibers is 2 nm or more and 2000 nm or less, a content of the cellulose nanofibers in the coating liquid is 10 mass % or more of solid contents of the coating liquid, and a coating amount of the coating layer is 0.2 g/m$^2$ or more in dry mass.

A second aspect of the present invention is that the method for producing a laminated body of the first aspect includes: a step of forming a first sealant layer composed of a thermoplastic resin on a surface of the base material different from the coating layer-side thereof, and of forming a second sealant layer composed of a thermoplastic resin on a surface of the coating layer different from the base material-side thereof.

A third aspect of the present invention is that the method for producing a laminated body of the second aspect includes: a step of forming an anchor coat layer between the coating layer and the second sealant layer.

A fourth aspect of the present invention is that the method for producing a laminated body of any one of the first to third aspects includes: a step of forming a print layer on at least one of a surface of the base material different from the coating layer-side thereof and a surface of the coating layer different from the base material-side thereof.

A fifth aspect of the present invention is a laminated body including: a base material composed of at least acid-resistant paper; and a coating layer containing cellulose nanofibers and laminated on the base material. In addition, an average fiber diameter of the cellulose nanofibers is 2 nm or more and 2000 nm or less, a content of the cellulose nanofibers in the coating layer is 10 mass % or more of the coating layer, a coating amount of the coating layer is 0.2 g/m² or more in dry mass, an arithmetic mean surface roughness of a surface of the coating layer is 1.1 μm or less, and an adhesion strength between the base material and the coating layer is 1.0 N/15 mm or more.

A sixth aspect of the present invention is that in the laminated body of the fifth aspect, the cellulose nanofibers include a carboxy group.

A seventh aspect of the present invention is that in the laminated body of the fifth or sixth aspect, the cellulose nanofibers are fibers obtained by defibratind a natural cellulose material.

A eighth aspect of the present invention is that in the laminated body of any one of the fifth to seventh aspects, the coating layer contains a water-soluble polymer.

A ninth aspect of the present invention is that in the laminated body of any one of the fifth to eighth aspects, a first sealant layer composed of a thermoplastic resin, a print layer, the base material, the coating layer, an anchor coat layer, and a second sealant layer composed of a thermoplastic resin are layered in this order.

A tenth aspect of the present invention is a paper packaging material composed of the laminated body of any one of the fifth to ninth aspects.

Effects of Invention

According to the above aspects of the present invention, the method for producing a laminated body includes: a step of applying a coating liquid containing cellulose nanofibers onto a base material composed of at least acid-resistant paper, thereby forming a coating layer, an average fiber diameter of the cellulose nanofibers is 2 nm or more and 2000 nm or less, a content of the cellulose nanofibers in the coating liquid is 10 mass % or more of solid contents of the coating liquid, and a coating amount of the coating layer is 0.2 g/m² or more in dry mass, whereby a laminated body excellent in surface smoothness and in adhesion between acid-resistant paper and the coating layer can be obtained.

DESCRIPTION OF EMBODIMENTS

Hereinafter, an embodiment applied with the present invention is described in detail.

Method for Producing Laminated Body

The method for producing a laminated body of this embodiment is a method for producing a laminated body in which a base material composed of at least acid-resistant paper, and a coating layer containing cellulose nanofibers are layered, the method including: a step (coating layer-forming step) of applying a coating liquid containing cellulose nanofibers onto the base material, thereby forming the coating layer. That is, the method for producing a laminated body of this embodiment is a method for producing a laminated body including a base material and a coating layer laminated on the base material, the method including: a coating layer-forming step of applying a coating liquid containing cellulose nanofibers onto the base material composed of at least acid-resistant paper, thereby forming the coating layer.

The method for producing a laminated body of this embodiment may include a step (sealant layer-forming step) of forming a sealant layer composed of a thermoplastic resin on each of a surface of the coating layer not contacting the base material and a surface of the base material not contacting the coating layer. That is, the method for producing a laminated body of this embodiment may include a sealant layer-forming step, after the coating layer-forming step, of forming a first sealant layer composed of a thermoplastic resin on a surface of the base material different from the coating layer-side thereof, and of forming a second sealant layer composed of a thermoplastic resin on a surface of the coating layer different from the base material-side thereof.

In addition, the method for producing a laminated body of this embodiment may include a step (anchor coat layer-forming step) of forming an anchor coat layer between the coating layer and the sealant layer. That is, the method for producing a laminated body of this embodiment may include an anchor coat layer-forming step, after the coating layer-forming step and before the sealant layer-forming step, of forming an anchor coat layer on a surface of the coating layer different from the base material-side thereof, and in the sealant layer-forming step, the second sealant layer may be formed on a surface of the coating layer different from the base material-side thereof through the anchor coat layer.

Furthermore, the method for producing a laminated body of this embodiment may include a step (print layer-forming step) of forming a print layer on at least one of a surface of the base material non contacting the coating layer and a surface of the coating layer not contacting the base material. That is, the method for producing a laminated body of this embodiment may include a print layer-forming step, after the coating layer-forming step, of forming a print layer on at least one of a surface of the base material different from the coating layer-side thereof and a surface of the coating layer different from the base material-side thereof. In addition, when the sealant layer-forming step is performed, the coating layer-forming step, the print layer-forming step and the sealant layer-forming step may be performed in this order. In addition, when both of the anchor coat layer-forming step and the sealant layer-forming step are performed, the coating layer-forming step, the print layer-forming step, the anchor coat layer-forming step and the sealant layer-forming step may be performed in this order, or the coating layer-forming step, the anchor coat layer-forming step, the print layer-forming step and the sealant layer-forming step may be performed in this order.

Next, each step is described.

Coating Layer-Forming Step

Acid-resistant paper of this embodiment denotes neutralized paper produced within a range between neutrality and week alkalinity.

The acid-resistant paper does not contain aluminum sulfate as a fixing agent, but has high water resistance, and is excellent particularly in resistance to an acidic liquid.

Although there is a case where a paperboard is provided with a print undercoat layer (coat layer) composed of clay or a binder in order to improve printability, in the acid-resistant paper of this embodiment, it is preferable to form a coating layer on a surface of base paper not provided with a coat layer.

In this embodiment, as cellulose nanofibers, fibers produced through the following method can be used.

Cellulose nanofibers are microfibrils or microfibril aggregates of cellulose or its derivative. Such cellulose nanofibers can be produced through a known production method.

A method for producing cellulose nanofibers includes, for example, a method in which a cellulose nanofiber precursor is defibrated in a dispersion medium (for example, water) to obtain a nanofiber dispersion liquid. Here, the cellulose nanofiber precursor is cellulose not subjected to defibration treatment and is composed of an aggregate of microfibrils.

The cellulose nanofiber precursor includes, for example, cellulose raw material, oxidized cellulose obtained by oxidizing cellulose raw material, carboxymethyl cellulose obtained by carboxymethylating cellulose raw material, and the like.

The cellulose raw material is not particularly limited as long as the raw material contains cellulose, and naturally derived cellulose can be used therefor. The naturally derived cellulose includes, for example, various kinds of wood pulp, non-wood pulp, bacterial cellulose, waste paper pulp, cotton, valonia cellulose, sea squirt cellulose and the like.

As the cellulose nanofiber precursor, various cellulose materials or microcrystalline cellulose powder, which are commercially available, can also be used.

A method for oxidizing the cellulose raw material to obtain oxidized cellulose can be appropriately selected from generally known methods for oxidizing from a hydroxyl group to a carboxy group via an aldehyde group. Among these methods, oxidation treatment (hereinafter, referred to as "TEMPO oxidation treatment") using an N-oxyl compound such as 2,2,6,6-tetramethyl-1-piperidine-N-oxy radical (hereinafter, referred to as "TEMPO") as a catalyst is preferable. When the TEMPO oxidation treatment is performed, only the alcoholic primary carbon at the C6 position of three carbons having the hydroxyl group of the cellulose molecule on the crystal surface can be selectively oxidized. Thus, the hydroxyl group of cellulose can be substituted with a carboxy group via an aldehyde group. According to this oxidation treatment, carboxy groups can be uniformly and efficiently introduced into cellulose depending on the degree of the TEMPO oxidation treatment. In addition, the TEMPO oxidation treatment is less likely to impair the crystallinity of cellulose than other oxidation treatments. Therefore, microfibrils of oxidized cellulose obtained through the TEMPO oxidation treatment retain high crystal structure (I-type crystal structure) possessed by natural cellulose, are excellent in heat resistance and chemical resistance, and are suitable for the coating layer.

The amount of carboxy groups to be introduced into cellulose (the molar amount of carboxy groups contained in 1 g of cellulose nanofibers) is preferably 0.1 mmol/g or more and 3.5 mmol/g or less, more preferably 0.5 mmol/g or more and 2.5 mmol/g or less, and furthermore preferably 1.0 mmol/g or more and 2.0 mmol/g or less.

When the amount of carboxy groups is 0.1 mmol/g or more, the cellulose nanofiber precursor becomes easier to turn into nanofibers during the fibrillation treatment therefor, and a uniform cellulose nanofiber dispersion liquid can be obtained. When the amount of carboxy groups is 3.5 mmol/g or less, the heat resistance and the chemical resistance of the coating layer formed using the cellulose nanofibers are improved.

In addition, the amount of carboxy groups of the cellulose nanofibers can be controlled by the reaction condition at the time of oxidation (one or more conditions of temperature, time and reagent amount).

As a treatment method for carboxymethylating the cellulose raw material to obtain carboxymethyl cellulose, a method of treating the cellulose raw material with monochloroacetic acid or sodium monochloroacetate, etherifying hydroxyl groups of cellulose and introducing carboxymethyl groups into cellulose can be used.

As the introduction amount of carboxymethyl groups to cellulose, the substitution degree thereof is preferably 0.5 or less. When the substitution degree is 0.5 or less, the solubility of cellulose does not increase, and the fiber shape thereof can be maintained. Therefore, the cellulose nanofibers have a fiber shape having microfibril as the structural unit, and a coating layer can be formed on the surface of paper without the cellulose nanofibers penetrating between the fibers of the paper.

In addition, the substitution degree of carboxymethyl groups in cellulose is the ratio in which hydroxyl groups of cellulose are substituted with carboxymethyl groups, and is defined by (the number of carboxymethyl groups after substitution)/(the number of hydroxyl groups before substitution).

The fibrillation treatment of the cellulose nanofiber precursor is not particularly limited, and a mechanical treatment using an ultrasonic homogenizer, a low-pressure homogenizer, a high-pressure homogenizer, a counter collision-type homogenizer, an ultra-high pressure homogenizer, a ball mill, a planetary mill, a high-speed rotation mixer, a grinder or the like can be used.

As the cellulose nanofibers, fibers produced through various methods and having different chemical structures, fiber diameters, or fiber lengths may be mixed and used. For example, nanofibers obtained by fibrillating a non-chemically treated cellulose nanofiber precursor, and TEMPO oxidized cellulose nanofibers may be mixed and used. For example, short-fiber cellulose nanofibers easily become low in viscosity and are suitable for coating, but tend to permeate between fibers of acid-resistant paper, and it is difficult to form a coating layer. Therefore, when short-fiber cellulose nanofibers and long-fiber cellulose nanofibers are mixed together, it is possible to obtain both coatability and film formability. The cellulose nanofibers to be used can be arbitrarily determined according to the compounding ratio of cellulose nanofibers to other components contained in the coating liquid, a coater to be used, or the like, and the optimal composition can be determined.

The average fiber diameter of the cellulose nanofibers of this embodiment is preferably 2 nm or more and 2000 nm or less, and more preferably 2 nm or more and 1000 nm or less.

When the average fiber diameter of the cellulose nanofibers is 2 nm or more, the cellulose nanofibers have a fiber shape having microfibril as the structural unit, and a coating layer having a sufficient strength can be formed on a surface of paper without the cellulose nanofibers penetrating between fibers of the paper. In addition, it is not realistic to produce cellulose nanofibers having an average fiber diameter less than 2 nm even if chemical pretreatment or dispersion treatment is combined therewith.

When the average fiber diameter of the cellulose nanofibers is 2000 nm or less, coarse fibers do not exist in the coating layer, and it is possible to prevent the smoothness of the coating layer from being affected. If cellulose nanofibers having an average fiber diameter greater than 2000 nm are used, when a coating layer is formed on a base material, fine spaces become easier to be formed between coarse fiber of acid-resistant paper and the coating layer, and the adhesion between the base material and the coating layer may deteriorate.

In addition, the fiber length of the cellulose nanofibers is preferably 100 nm or more and 10 μm or less.

As a method for measuring the fiber diameter of the cellulose nanofibers, a method in which the shapes of a large number of cellulose nanofibers are observed using an apparatus such as an atomic force microscope (AFM) or a scanning electron microscope (SEM) to measure the fiber diameters thereof, and the measured values are averaged, or a method of measuring from the result of particle diameter measurement of a coating liquid containing cellulose nanofibers using a device such as a particle size distribution meter is used.

The coating liquid of this embodiment may contain, as required, various additives such as a surfactant for improving coatability, an antifoaming agent, a dispersing agent, and a crosslinking agent for improving the film quality, as long as the effect of this embodiment is not impaired.

The content of cellulose nanofibers in the coating liquid is 10 mass % or more of solid contents of the coating liquid, and is preferably 20 mass % or more thereof. That is, in the formed coating layer, the content of cellulose nanofibers is 10 mass % or more of the coating layer, and is preferably 20 mass % or more thereof.

The coating liquid of this embodiment may contain a water-soluble polymer as an additive. By adding a water-soluble polymer thereto, the flexibility of the coating layer increases, and breakage of the coating layer during the manufacturing process or the forming process can be limited.

The water-soluble polymer is not particularly limited as long as the polymer is a substance uniformly mixable with cellulose nanofibers, but in particular, from the viewpoint of affinity with cellulose nanofibers and of availability, polyvinyl alcohol (PVA) or carboxymethyl cellulose (CMC) is preferable. The degree of polymerization of the water-soluble polymer and the amount of the functional groups are not particularly limited, but may be appropriately determined according to the purpose.

Usually, when a water-based coating liquid is applied onto acid-resistant paper to form a coating layer, since the coating liquid has low permeability to acid-resistant paper, the coating liquid remains on the surface of the acid-resistant paper, the coating liquid may unevenly exist due to the unevenness of the surface of the acid-resistant paper, and the unevenness of the coating layer may easily occur. When the coating liquid contains cellulose nanofibers, uneven existence of the coating liquid is limited by the thixotropic effect of the cellulose nanofibers, and the coating layer can be uniformly formed. Further, since the cellulose nanofibers have a fiber shape, the cellulose nanofibers can be deposited on the surface of the acid-resistant paper to form a dense layer without penetrating between fibers of the acid-resistant paper, and the surface of the acid-resistant paper can be smoothed. In this way, by uniformly forming the coating layer without unevenness in film thickness, the function of the coating layer can be exerted without defect.

In particular, when a substance having a carboxy group in the molecule thereof is used for cellulose nanofibers or a water-soluble polymer, since a strong hydrogen bond is formed between the carboxyl group in the coating liquid and the fibers of the acid-resistant paper, the coating layer and the acid-resistant paper can be layered with good adhesion.

The cellulose nanofibers having a carboxy group include, for example, TEMPO oxidized cellulose nanofibers, carboxymethylated cellulose nanofibers and the like.

The water-soluble polymer having a carboxy group includes, for example, carboxymethyl cellulose, polyacrylic acid and the like.

The method for applying the coating liquid to the base material composed of acid-resistant paper is not particularly limited, but a known coating method can be used. The coating method includes, for example, a coating method using a gravure coater, a dip coater, a reverse coater, a spin coater, a wire bar coater, a die coater, a spray coater, offset printing, letterpress printing, gravure printing or the like.

By using a wet film forming method, it is possible to uniformly form a coating layer on the surface of the base material. The solvent of the coating liquid is also not particularly limited as long as it is a solvent in which cellulose nanofibers are dispersible with good dispersibility, but one or more kinds of various liquids including water, alcohol and the like can be used therefor.

The coating amount of the coating liquid to the base material is preferably 0.2 $g/m^2$ or more in dry mass, and is more preferably 0.4 $g/m^2$ or more in dry mass.

When the coating amount of the coating liquid is 0.2 $g/m^2$ or more in dry mass, the effect of smoothness as the coating layer can be obtained. That is, the coating layer can be sufficiently smoothed. If there is unevenness in the coating layer, a portion with a small thickness is formed in the coating layer, this thin portion may have low gas barrier property, and therefore the smoothness is very important for the gas barrier property.

A coating film of a coating liquid applied to a base material formed of acid-resistant paper is dried to form a coating layer on the base material. That is, the solvent contained in the coating film of the coating liquid is evaporated and removed by drying, and the coating layer is formed of the solid contents of the coating liquid.

The coating layer of this embodiment can be used as a coating layer for imparting functionality such as a pattern printing undercoat layer (coating layer), a light shielding layer, a water and oil repellent layer, a gas barrier layer, antibacterial, or deodorization.

The method for drying a coating film on the base material includes natural drying, blowing drying, hot air drying, UV drying, hot roll drying, infrared irradiation and the like.

The drying temperature is preferably 100° C. to 180° C. When the drying temperature is 100° C. or higher, the crosslinking points between cellulose nanofibers or between the cellulose nanofiber and the surface of the paper base material increase so that the strength of the coating layer, and the adhesion between the cellulose nanofibers or between the cellulose nanofibers and the surface of the base material is improved. In addition, since moisture in the coating film is released, hydrogen bonding between cellulose molecules increases, the cohesive force of the coating layer increases, and the bending resistance is improved. On the other hand, when the drying temperature is 180° C. or less, it is possible to prevent the coating layer from deteriorating and discoloring due to heat.

Particularly, in a case where cellulose nanofibers (for example, carboxymethyl cellulose) or a water-soluble polymer, into which carboxy groups are introduced, are used, when acidic contents are filled, an effect of further improving the water resistance of the base material is obtained. It is considered that the carboxy group in the cellulose nanofiber contributes to this effect. When cellulose into which carboxy group or carboxymethyl group has been introduced is turned into nanofibers, the carboxy group in the cellulose molecule is generally made to be in a salt type (COONa type) having a metal ion such as sodium as a counter ion. When the carboxy group is in an acid type (COOH type), a large amount of energy is required for defibration or dispersion, and there is a possibility that it is not easy to fine cellulose so as to have a fiber diameter suitable for this embodiment. An electrostatic repulsive force acts between the cellulose nanofibers by setting the carboxy group to be in the salt type, so that the cellulose nanofibers can be easily dispersed. When the coating liquid containing cellulose nanofibers is applied on the base material in a state where the carboxy group is in the salt type and is dried, the cellulose nanofibers of the obtained laminated body also become a salt type. For example, when an acidic content is filled in a paper cup formed of the laminated body, the carboxyl group in the cellulose nanofiber becomes an acid type due to acid penetrating from the edge of acidic paper, the repulsive force between the cellulose nanofibers weakens, and the coating layer containing cellulose nanofibers condenses, resulting in a harder paper cup. Here, the acidic content means a liquid or semisolid content having a pH of 6 or less, and includes, for example, a dairy product, a lactic acid bacteria beverage, a fermented milk, a dressing and the like. The pH of the acidic content is a value measured at 25° C.

Sealant Layer-Forming Step

After forming the coating layer on the base material composed of acid-resistant paper, a sealant layer composed of a thermoplastic resin can be formed on a surface of the coating layer not contacting the base material (a surface of the coating layer different from the base material-side thereof) and on a surface of the base material not contacting the coating layer (a surface of the base material different from the coating layer-side thereof).

The sealant layer can be usually formed through a method of producing a packaging material. Such a method includes, for example, a wet lamination method, a dry lamination method, a solventless lamination method, a thermal lamination method, a melt extrusion lamination method and the like. The sealant layer may be formed on the entire surface or part of the base material as required. A sealant layer may be formed on at least one of the surface of the coating layer different from the base material-side and the surface of the base material different from the coating layer-side.

In a case of forming a sealant layer (second sealant layer) on the coating layer, in order to improve adhesion, the coating layer may be previously performed with known surface treatment such as corona treatment, ozone treatment, plasma treatment, glow discharge treatment, or oxidation treatment using chemical agent. Alternatively, a primer coat layer, an anchor coat layer, an adhesive layer or the like may be arbitrarily formed between the coating layer and the sealant layer.

The resin configuring the sealant layer is not particularly limited, and a heat-sealable resin is used therefor. Such a resin can be selected from, for example, polyethylene-based resins such as a low density polyethylene resin (LDPE), a medium density polyethylene resin (MDPE), a high density polyethylene resin (HDPE) and a linear low density polyethylene (LLDPE), and polypropylene-based resins such as a polypropylene resin, a propylene-ethylene random copolymer and a propylene-ethylene block copolymer. From the viewpoints of workability, processability, economic efficiency and the like, a linear low density polyethylene resin (LLDPE) is preferable.

By forming a heat-sealable sealant layer, the laminated body obtained through the method for producing a laminated body of this embodiment can be worked and used as a paper packaging material. Further, by forming the sealant layer, it is possible to impart, to the laminated body, antifouling property or liquid resistance to liquid having high permeability. In particular, it is suitable for a packaging material of an acidic content such as a dairy product, a lactic acid bacteria beverage, a fermented milk or a dressing.

Print Layer-Forming Step

Before forming the sealant layer, as required, a print layer may be formed on at least one of a surface of the base material not contacting the coating layer (a surface of the base material different from the coating layer-side thereof) and a surface of the coating layer not contacting the base material (a surface of the coating layer different from the base material-side thereof). In a case where the laminated body of this embodiment is used as a paper packaging material (paper container), from the viewpoint of exhibiting the function, it is preferable that the coating layer that imparts functionality be the inner side (the inner side of the container), and the other surface of the base material be a printed surface, namely, the outer side (the outer side of the container).

According to the method for producing a laminated body of this embodiment, since the method includes a step of applying a coating liquid containing cellulose nanofibers on a base material composed of acid-resistant paper to form a coating layer, a laminated body excellent in smoothness of the surface and in adhesion between the acid-resistant paper and the coating layer can be obtained.

Laminated Body

The laminated body of this embodiment is a member produced through the method for producing a laminated body of this embodiment, in which a base material composed of at least acid-resistant paper and a coating layer containing cellulose nanofibers are layered together.

In the laminated body of this embodiment, the arithmetic mean surface roughness (Ra) on the surface of the coating layer is 1.1 µm or less, and is preferably 1.0 µm or less.

When the arithmetic mean surface roughness (Ra) on the surface of the coating layer exceeds 1.1 µm, the smoothness of the surface of the coating layer deteriorates.

Usually, the surface roughness of acid-resistant paper has an arithmetic mean surface roughness (Ra) of about 1.5 µm to 3.5 µm. When a coating layer is formed on a base material having such a surface roughness, defects easily occur in the coating layer if the coating amount is small due to the high hydrophobicity of the acid-resistant paper. When using a coating liquid containing cellulose nanofibers, it is possible to form a coating layer without defects with a small coating amount. Furthermore, the arithmetic mean surface roughness (Ra) on the surface of the obtained coating layer becomes 1.1 μm or less. On the other hand, since the arithmetic mean surface roughness (Ra) on the surface of commercially available coated paper is approximately 1.1 μm or less, if the arithmetic mean surface roughness (Ra) on the surface of the coating layer is 1.1 μm or less, it is possible to decide that the unevenness on the surface of the paper base material is sufficiently covered and a smooth coating layer is formed on the surface of the paper base material. When the arithmetic mean surface roughness (Ra) on the surface of the coating layer exceeds 1.1 μm, the surface of the paper base material may not have been coated. In this case, there is a possibility that the function of the coating layer cannot be sufficiently exerted.

In this embodiment, the arithmetic mean surface roughness (Ra) on the surface of the coating layer is measured using a laser microscope.

In the laminated body of this embodiment, the adhesion strength between the base material and the coating layer is 1.0 N/15 mm or more, is preferably 1.5 N/15 mm or more, and is more preferably 2.0 N/15 mm or more.

When the adhesion strength between the base material and the coating layer is less than 1.0 N/15 mm, the coating layer is easily peeled from the base material, and defects of interfacial peeling are likely to occur in the laminated body at the time of use.

In this embodiment, the adhesion strength between the base material and the coating layer is measured as follows. The laminated body is cut into a strip shape with a width of 15 mm and a length of 100 mm to make it a test piece. With respect to this test piece, T-peeling is carried out at a pulling rate of 300 mm/min in accordance with JIS-K-7127, and the adhesion strength between the acid-resistant paper and the coating layer is measured.

As the laminated body of this embodiment, a member is preferable, in which a sealant layer (first sealant layer), a print layer, a base material, a coating layer, an anchor coat layer, and a sealant layer (second sealant layer) are layered in this order. Thereby, in a case where the laminated body of this embodiment is used as a paper packaging material, when the surface of the laminated body on which the coating layer is provided is arranged on the inside and the surface of the laminated body on which the print layer is provided is arranged on the outside, the function of the coating layer can be appropriately exerted, and designs and information by the print layer can be displayed to outside.

According to the laminated body of this embodiment, the following effects can be obtained. That is, since a coating layer formed by applying a coating liquid containing cellulose nanofibers on a base material composed of acid-resistant paper is provided, it is possible to provide a laminated body excellent in surface smoothness and in adhesion between the acid-resistant paper and the coating layer.

The present invention is not limited to the above-described embodiments, and various modifications can be adopted within the scope of the present invention. Further, the specific configuration, material and the like of each component are not limited to the configurations exemplified in the above-described embodiments, and can be appropriately modified.

For example, the sealant layer is not essential for the laminated body of the present invention, and a configuration forming no sealant layer is allowed. For example, in a case where the bonding strength between the coating layer and the second sealant layer can be sufficiently secured, a configuration forming no anchor coat layer therebetween is allowed. A configuration is allowed in which the print layer is formed on at least one of the surface of the base material different from the coating layer-side thereof and the surface of the coating layer different from the base material-side thereof, and the sealant layer is not formed. An anchor coat layer may be formed between the print layer and the surface of the coating layer different from the base material-side thereof, or an anchor coat layer may be formed between the print layer and the sealant layer.

EXAMPLES

Hereinafter, the present invention is more specifically described with reference to Examples, but the present invention is not limited to the following Examples.

Production Example 1 of Cellulose Nanofiber

Water was added to 18 g of conifer kraft pulp to make it 1800 g, it was treated with a rotary blade-type mixer for 30 seconds, and the conifer kraft pulp was coarsely dispersed in water.

In that state, it was allowed to stand for 3 days, and the conifer kraft pulp was sufficiently swollen.

The swollen conifer kraft pulp was treated 8 times with a grinding stone E-#46 and twice with G-#80 at a millstone-type grinder (product name: Supermasscolloider MKCA 6-2, manufactured by Masuko Sangyo Co., Ltd.) to obtain a white creamy dispersion of cellulose nanofibers having a solid content concentration of 1%.

Production Example 2 of Cellulose Nanofiber 30 g of conifer kraft pulp was immersed in 600 g of water and was treated with a rotary blade-type mixer for 30 seconds to coarsely disperse the conifer kraft pulp in water.

0.3 g of TEMPO previously dissolved in 200 g of water and 3 g of NaBr were added to the dispersed pulp slurry, and it was further diluted with water to make the total 1400 mL.

The interior of the system was kept at 20° C., and an aqueous sodium hypochlorite solution was dropped into the diluted solution of pulp slurry so as to be 10 mmol with respect to 1 g of cellulose.

Although the pH of the diluted solution began to decrease from the start of the dropping, a 0.5 N aqueous sodium hydroxide solution was dropped at any time, and the pH of the diluted solution was kept at 10.

After 4 hours, when the dropped amount of the 0.5 N aqueous sodium hydroxide solution became 2.8 mmol/g, 30 g of ethanol was added to the diluted solution to stop the reaction.

0.5 N hydrochloric acid was added to the diluted solution, and the pH of the diluted solution was lowered to 2.

The diluted solution was filtered to recover the pulp, and the pulp was repeatedly washed with 0.01 N hydrochloric acid or water to obtain oxidized pulp.

Conductivity titration of the oxidized pulp was carried out with a 0.1 N aqueous sodium hydroxide solution using an automatic titration device (product name: AUT-701, manufactured by DKK-TOA Corporation), and the amount of carboxyl group was determined to be 1.6 mmol/g.

The obtained oxidized pulp was diluted with water, and the pH was adjusted to 9 with 0.5 N aqueous sodium hydroxide solution to obtain a suspension of oxidized pulp 1.5%.

This suspension was dispersed for 2 hours with a rotary blade-type mixer to obtain a colorless and transparent dispersion of cellulose nanofibers having a solid content concentration of 1.5%.

Evaluation of Production Examples 1 and 2 of Cellulose Nanofiber

The average fiber diameter of the cellulose nanofibers contained in the dispersions obtained in Production Examples 1 and 2 was measured.

Each dispersion was diluted to a concentration of 0.001% and was applied onto mica, and the fiber form thereof was observed with an atomic force microscope (AFM). The average of the widths of arbitrary 10 fibers existing one by one was determined and taken as the average fiber diameter.

As a result, the average fiber diameter of the cellulose nanofibers of Production Example 1 was 1800 nm, and the average fiber diameter of the cellulose nanofibers of Production Example 2 was 4 nm.

Practical Example 1

The cellulose nanofibers of Production Example 1 was applied onto a base material composed of acid-resistant paper (acid-resistant cup base paper, basis weight 240 g/m$^2$, manufactured by Oji F-Tex Co., Ltd.) with a bar coater #100 to form a coating film, and then the coating film was dried in an oven at 120° C. for 15 minutes to obtain a laminated body of Practical Example 1 in which a coating layer having a coating amount of 1.4 g/m$^2$ was formed on the acid-resistant paper.

Practical Example 2

The cellulose nanofibers of Production Example 2 was applied onto a base material composed of acid-resistant paper (acid-resistant cup base paper, basis weight 240 g/m$^2$, manufactured by Oji F-Tex Co., Ltd.) with a bar coater #70 to form a coating film, and then the coating film was dried in an oven at 120° C. for 15 minutes to obtain a laminated body of Practical Example 2 in which a coating layer having a coating amount of 1.4 g/m$^2$ was formed on the acid-resistant paper.

Practical Example 3

A coating liquid containing 0.5 parts by mass of the cellulose nanofibers of Production Example 1, 0.5 parts by mass of the cellulose nanofibers of Production Example 2, and 99 parts by mass of water and obtained by mixing them was applied onto a base material composed of acid-resistant paper (acid-resistant cup base paper, basis weight 240 g/m$^2$, manufactured by Oji F-Tex Co., Ltd.) with a bar coater #100 to form a coating film, and then the coating film was dried in an oven at 120° C. for 15 minutes to obtain a laminated body of Practical Example 3 in which a coating layer having a coating amount of 1.4 g/m$^2$ was formed on the acid-resistant paper.

Practical Example 4

A coating liquid containing 0.75 parts by mass of the cellulose nanofibers of Production Example 1, 0.75 parts by mass of the cellulose nanofibers of Production Example 2, and 98.5 parts by mass of water and obtained by mixing them was applied onto a base material composed of acid-resistant paper (acid-resistant cup base paper, basis weight 240 g/m$^2$, manufactured by Oji F-Tex Co., Ltd.) with a bar coater #70 to form a coating film, and then the coating film was dried in an oven at 120° C. for 15 minutes to obtain a laminated body of Practical Example 4 in which a coating layer having a coating amount of 1.3 g/m$^2$ was formed on the acid-resistant paper.

Practical Example 5

A coating liquid containing 0.75 parts by mass of the cellulose nanofibers of Production Example 2, 0.75 parts by mass of carboxymethyl cellulose (product number: 1130, manufactured by Daicel Corporation), and 98.5 parts by mass of water and obtained by mixing them was applied onto a base material composed of acid-resistant paper (acid-resistant cup base paper, basis weight 240 g/m$^2$, manufactured by Oji F-Tex Co., Ltd.) with a bar coater #70 to form a coating film, and then the coating film was dried in an oven at 120° C. for 15 minutes to obtain a laminated body of Practical Example 5 in which a coating layer having a coating amount of 1.4 g/m$^2$ was formed on the acid-resistant paper.

Practical Example 6

A coating liquid containing 0.75 parts by mass of the cellulose nanofibers of Production Example 2, 0.75 parts by mass of polyvinyl alcohol (product number: PVA124, manufactured by Kuraray Co., Ltd.), and 98.5 parts by mass of water and obtained by mixing them was applied onto a base material composed of acid-resistant paper (acid-resistant cup base paper, basis weight 240 g/m$^2$, manufactured by Oji F-Tex Co., Ltd.) with a bar coater #70 to form a coating film, and then the coating film was dried in an oven at 120° C. for 15 minutes to obtain a laminated body of Practical Example 6 in which a coating layer having a coating amount of 1.4 g/m$^2$ was formed on the acid-resistant paper.

Comparative Production Example of Cellulose Nanofiber

Water was added to 18 g of conifer kraft pulp to make it 1800 g, it was treated with a rotary blade-type mixer for 30 seconds, and the conifer kraft pulp was coarsely dispersed in water.

In that state, it was allowed to stand for 3 days, and the conifer kraft pulp was sufficiently swollen.

The swollen conifer haft pulp was treated 8 times with a grinding stone E-#46 at a millstone-type grinder (product name: Supermasscolloider MKCA 6-2, manufactured by Masuko Sangyo Co., Ltd.) to obtain a white creamy dispersion of cellulose nanofibers having a solid content concentration of 1%.

Evaluation of Comparative Production Example of Cellulose Nanofiber

The average fiber diameter of the cellulose nanofibers contained in the dispersion obtained in Comparative Production Example was measured.

The dispersion was diluted to a concentration of 0.1% and was applied on glass, and the fiber form thereof was observed with a laser microscope. The average of the widths of arbitrary 10 fibers existing one by one was determined and taken as the average fiber diameter.

As a result, the average fiber diameter of the cellulose nanofibers of Comparative Production Example was 2500 nm.

Comparative Example 1

A coating liquid of polyvinyl alcohol (product name: PVA124, manufactured by Kuraray Co., Ltd.) having a solid content concentration of 3 mass % was applied onto a base material composed of acid-resistant paper (acid-resistant cup base paper, basis weight 240 g/m$^2$, manufactured by Oji F-Tex Co., Ltd.) with a bar coater #32 to form a coating film, and then the coating film was dried in an oven at 120° C. for 15 minutes to obtain a laminated body of Comparative Example 1 in which a coating layer having a coating amount of 1.3 g/m$^2$ was formed on the acid-resistant paper.

Comparative Example 2

A coating liquid of carboxymethyl cellulose (product number: 1130, manufactured by Daicel Corporation) having a solid content concentration of 2 mass % was applied onto a base material composed of acid-resistant paper (acid-resistant cup base paper, basis weight 240 g/m$^2$, manufactured by Oji F-Tex Co., Ltd.) with a bar coater #50 to form a coating film, and then the coating film was dried in an oven at 120° C. for 15 minutes to obtain a laminated body of Comparative Example 2 in which a coating layer having a coating amount of 1.4 g/m$^2$ was formed on the acid-resistant paper.

Comparative Example 3

A coating liquid (solid content ratio (mass ratio): cellulose nanofibers/polyvinyl alcohol=5/95) containing 0.14 parts by mass of the cellulose nanofibers of Production Example 2, 2.56 parts by mass of polyvinyl alcohol (product number: PVA124, manufactured by Kuraray Co., Ltd.), and 97.3 parts by mass of water and obtained by mixing them was applied onto a base material composed of acid-resistant paper (acid-resistant cup base paper, basis weight 240 g/m$^2$, manufactured by Oji F-Tex Co., Ltd.) with a bar coater #40 to form a coating film, and then the coating film was dried in an oven at 120° C. for 15 minutes to obtain a laminated body of Comparative Example 3 in which a coating layer having a coating amount of 1.3 g/m$^2$ was formed on the acid-resistant paper.

Comparative Example 4

The cellulose nanofibers of Comparative Production Example was applied onto a base material composed of acid-resistant paper (acid-resistant cup base paper, basis weight 240 g/m$^2$, manufactured by Oji F-Tex Co., Ltd.) with a bar coater #100 to form a coating film, and then the coating film was dried in an oven at 120° C. for 15 minutes to obtain a laminated body of Comparative Example 4 in which a coating layer having a coating amount of 1.4 g/m$^2$ was formed on the acid-resistant paper.

Evaluation 1

With respect to the laminated bodies of Practical Examples 1 to 5 and Comparative Examples 1 to 4, the arithmetic mean surface roughness (Ra) of the coating layer was measured using a laser microscope (product name: OLS-4000, manufactured by Olympus Corporation).

The results thereof are shown in Table 1.

Evaluation 2

On the laminated bodies of Practical Examples 1 to 5 and Comparative Examples 1 to 4, a polyethylene (PE) layer having a thickness of 30 μm was formed through a melt extrusion lamination method, and laminated bodies in which "PE layer/coating layer/acid-resistant paper" were layered in this order were made.

Each obtained laminated body was cut into a strip having a width of 15 mm and a length of 100 mm to make it a test piece.

With respect to this test piece, T-peeling was carried out at a pulling rate of 300 mm/min in accordance with JIS-K-7127, and the adhesion strength (N/15 mm) between the acid-resistant paper and the coating layer was measured.

The results thereof are shown in Table 1.

TABLE 1

| | ARITHMETIC MEAN SURFACE ROUGHNESS (Ra) [μm] | ADHESIVE STRENGTH [N/15 mm] |
| --- | --- | --- |
| PRACTICAL EXAMPLE 1 | 1.08 | 3.1 |
| PRACTICAL EXAMPLE 2 | 1.02 | 3.5 (PARTIAL BASE MATERIAL BREAKAGE) |
| PRACTICAL EXAMPLE 3 | 1.07 | 3.2 |
| PRACTICAL EXAMPLE 4 | 0.99 | 3.7 (PARTIAL BASE MATERIAL BREAKAGE) |
| PRACTICAL EXAMPLE 5 | 1.01 | BASE MATERIAL BREAKAGE |
| PRACTICAL EXAMPLE 6 | 1.02 | BASE MATERIAL BREAKAGE |
| COMPARATIVE EXAMPLE 1 | 1.67 | BASE MATERIAL BREAKAGE |
| COMPARATIVE EXAMPLE 2 | 1.76 | BASE MATERIAL BREAKAGE |
| COMPARATIVE EXAMPLE 3 | 1.55 | BASE MATERIAL BREAKAGE |
| COMPARATIVE EXAMPLE 4 | 1.35 | 0.5 |

When comparing the laminated bodies of Practical Examples 1 to 6 and the laminated bodies of Comparative Examples 1 to 4 with reference to the results of Table 1, if a coating layer is formed on acid-resistant paper using a coating liquid containing cellulose nanofibers, it was understood that a laminated body excellent in smoothness of the surface thereof and in adhesion between the acid-resistant paper and the coating layer is obtained.

Industrial Applicability

The laminated body of the present invention is excellent in smoothness of the surface thereof and in adhesion between the acid-resistant paper and the coating layer, and thus can be applied to various fields such as containers and packaging materials for foods, toiletry products, chemicals, medical products, electronic components and the like.

The invention claimed is:

1. A method for producing a laminated body including a base material and a coating layer laminated on the base material, the method comprising:

applying a coating liquid containing cellulose nanofibers onto the base material composed of at least acid-resistant paper, thereby forming the coating layer; wherein
  an average fiber diameter of the cellulose nanofibers is 2 nm or more and 2000 nm or less,
  a content of the cellulose nanofibers in the coating liquid is 10 mass % or more of solid contents of the coating liquid,
  a coating amount of the coating layer is 0.2 g/m2 or more in dry mass, and
  the cellulose nanofibers includes:
    first cellulose nanofibers resulted from fibrillating non-chemically treated cellulose raw material, and
    second cellulose nanofibers having a different chemical structure from a chemical structure of the first cellulose nanofibers, the second cellulose nanofibers having carboxyl groups substituted for hydroxyl groups resulted from oxidation based on a 2,2,6,6-tetramethyl-1-piperidine-N-oxy radical.

2. The method for producing a laminated body according to claim 1, comprising:
  forming a first sealant layer composed of a thermoplastic resin on a surface of the base material different from the coating layer-side thereof, and of forming a second sealant layer composed of a thermoplastic resin on a surface of the coating layer different from the base material-side thereof.

3. The method for producing a laminated body according to claim 2, comprising:
  forming an anchor coat layer between the coating layer and the second sealant layer.

4. The method for producing a laminated body according to claim 1, comprising:
  forming a print layer on at least one of a surface of the base material different from the coating layer-side thereof and a surface of the coating layer different from the base material-side thereof.

5. A laminated body comprising:
  a base material composed of at least acid-resistant paper; and
  a coating layer containing cellulose nanofibers and laminated on the base material; wherein
    an average fiber diameter of the cellulose nanofibers is 2 nm or more and 2000 nm or less,
    a content of the cellulose nanofibers in the coating layer is 10 mass % or more of the coating layer,
    a coating amount of the coating layer is 0.2 g/m2 or more in dry mass,
    an arithmetic average surface roughness of a surface of the coating layer is 1.1 μm or less, and an adhesion strength between the base material and the coating layer is 1.0 N/15 mm or more, and
    the cellulose nanofibers includes:
      first cellulose nanofibers resulted from fibrillating non-chemically treated cellulose raw material, and
      second cellulose nanofibers having a different chemical structure from a chemical structure of the first cellulose nanofibers, the second cellulose nanofibers having carboxyl groups substituted for hydroxyl groups resulted from oxidation based on a 2,2,6,6-tetramethyl-1-piperidine-N-oxy radical.

6. The laminated body according to claim 5, wherein the cellulose nanofibers include a carboxy group.

7. The laminated body according to claim 5, wherein the cellulose nanofibers include fibers obtained by defibrating a natural cellulose material.

8. The laminated body according to claim 5, wherein the coating layer contains a water-soluble polymer.

9. The laminated body according to claim 5, wherein a first sealant layer composed of a thermoplastic resin, a print layer, the base material, the coating layer, an anchor coat layer, and a second sealant layer composed of a thermoplastic resin are layered in this order.

10. A paper packaging material composed of the laminated body according to claim 5.

11. The laminated body according to claim 5, wherein the coating layer is formed on a surface of the acid-resistant paper not provided with a coat layer.

* * * * *